United States Patent
Tsai

(10) Patent No.: US 6,989,511 B1
(45) Date of Patent: Jan. 24, 2006

(54) SOLDERING IRON WITH WIRE SEPARATOR IN HANDLE

(75) Inventor: Jung-Fa Tsai, Taichung (TW)

(73) Assignee: Arlo Lin, Tortola (VG)

( * ) Notice: Subject to any disclaimer, the term of this patent is extended or adjusted under 35 U.S.C. 154(b) by 0 days.

(21) Appl. No.: 10/933,731

(22) Filed: Sep. 3, 2004

(51) Int. Cl.
*B23K 3/02* (2006.01)

(52) U.S. Cl. ........................................ 219/229; 228/51
(58) Field of Classification Search ........ 219/227–233, 219/236–241, 222–223, 245; 228/51–55
See application file for complete search history.

(56) References Cited

U.S. PATENT DOCUMENTS

| | | | |
|---|---|---|---|
| 2,274,408 A | * | 2/1942 | Hampton et al. ........... 219/229 |
| 2,359,393 A | * | 10/1944 | Sloan .......................... 219/233 |
| 2,366,910 A | * | 1/1945 | Kollath ....................... 219/238 |
| 2,383,699 A | * | 8/1945 | Atkinson .................... 219/229 |
| 2,459,371 A | * | 1/1949 | Foster .......................... 174/46 |
| 2,952,763 A | * | 9/1960 | Gustafsson ................... 228/53 |
| 3,048,687 A | * | 8/1962 | Knowles ..................... 219/530 |
| 3,061,704 A | * | 10/1962 | Wheeler et al. ............ 219/229 |
| 3,248,034 A | * | 4/1966 | McNutt ........................ 228/55 |
| 3,264,449 A | * | 8/1966 | Brenner ...................... 219/227 |
| 3,316,385 A | * | 4/1967 | Anton ......................... 219/236 |
| 5,422,457 A | * | 6/1995 | Tang et al. ................. 219/238 |

FOREIGN PATENT DOCUMENTS

| | | | |
|---|---|---|---|
| GB | 590072 | * | 7/1947 |
| GB | 1154437 | * | 6/1969 |
| SE | 59551 | * | 3/1921 |
| SE | 139674 | * | 3/1953 |

* cited by examiner

*Primary Examiner*—John A. Jeffery
(74) *Attorney, Agent, or Firm*—Alan D. Kamrath; Nikolai & Mersereau, P.A.

(57) ABSTRACT

A soldering iron includes a handle, a heater, a soldering tip, a power cable and a separator. The heater is connected with the handle. The heater includes two leads extending from one end thereof. The soldering tip is connected with the heater. The power cable includes two wires connected with the leads of the heater. The separator is put in the handle. The separator is used for separating the wires from each other.

11 Claims, 7 Drawing Sheets

SOLDERING IRON WITH WIRE SEPARATOR IN HANDLE

BACKGROUND OF INVENTION

1. Field of Invention

The present invention relates to a soldering iron.

2. Related Prior Art

Referring to FIG. 5, a conventional soldering iron 1 includes a handle 10, a heater 20, a soldering tip 30 and a power cable 40. The heater 20 is put in the handle 10. The soldering tip 30 is attached to the heater 20. The heater 20 includes two leads 21 extending from an end thereof. The power cable 40 diverges into two wires 41 in the handle 10. Each of the leads 21 is connected with a related one of the wires 41. Referring to FIG. 6, an exposed end of each wire 41 is firmly connected with an exposed end of a related lead 21 by a metal plate 42. One of the metal plates 42, the related wire 41 and the related lead 21 must be put in a rubber pipe 43 for preventing a short circuit. To this end, the rubber pipe 43 must be cut at an appropriate length. Then, the rubber pipe 43 is put on one of the wires 41 or one of the leads 21 before that wire 41 is connected with the related lead 21 through the metal plate 42. The rubber pipe 43 is moved to a position for covering that metal plate 42, the exposed end of the related wire 41 and the exposed end of the related lead 21. Finally, the rubber pipe 43 is heated for contraction. The soldering iron 1 involves a complicated process.

Referring to FIG. 7, in another conventional soldering iron, each of the wires 41 is connected with related one of the leads 21 through a metal plate 44. Each of the metal plates 44 includes a pair of locking portions 45 formed at each end for holding the exposed end of the related wire 41 or lead 21. One of the metal plates 44, the exposed end of the related wire 41 and the exposed end of the related lead 21 must be put in a rubber pipe 43 for preventing a short circuit. It involves a complicated process of production.

The present invention is therefore intended to obviate or at least alleviate the problems encountered in the prior art.

SUMMARY OF INVENTION

A soldering iron includes a handle, a heater, a soldering tip, a power cable and a separator. The heater is connected with the handle. The heater includes two leads extending from one end thereof. The soldering tip is connected with the heater. The power cable includes two wires connected with the leads of the heater. The separator is put in the handle. The separator is used for separating the wires from each other.

The primary advantage of the soldering iron according to the present invention over the conventional soldering irons discussed in Related Prior Art is a simple process of production for the use of the separator.

Other objects, advantages, and novel features of the invention will become more apparent from the following detailed description when taken in conjunction with the drawings.

BRIEF DESCRIPTION OF DRAWINGS

The present invention will be described through detailed illustration of the preferred embodiment referring to the drawings.

DETAILED DESCRIPTION OF PREFERRED EMBODIMENT

Figure 1:
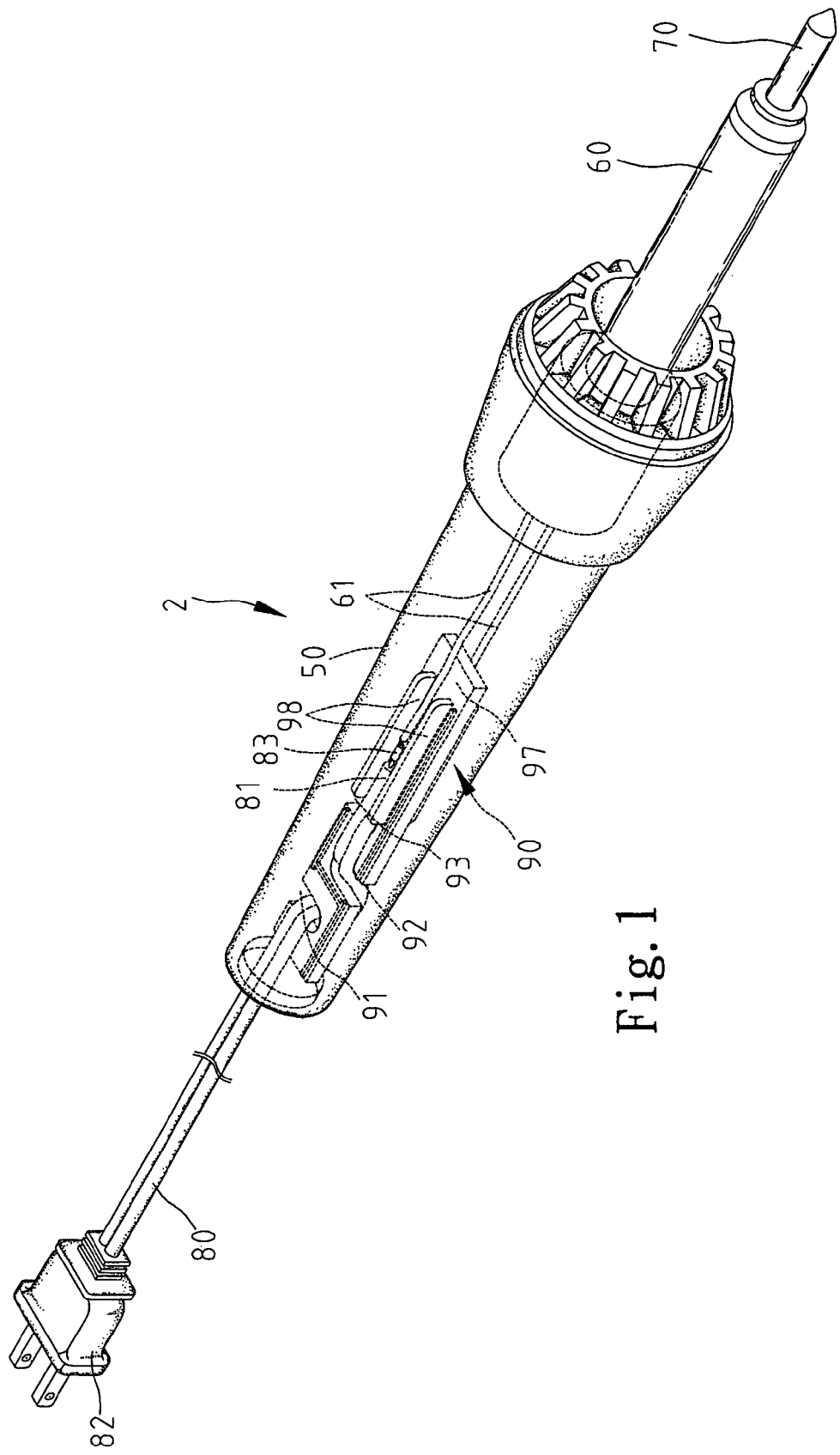
FIG. 1 is a perspective view of a soldering iron according to the preferred embodiment of the present invention.
Figure 2:
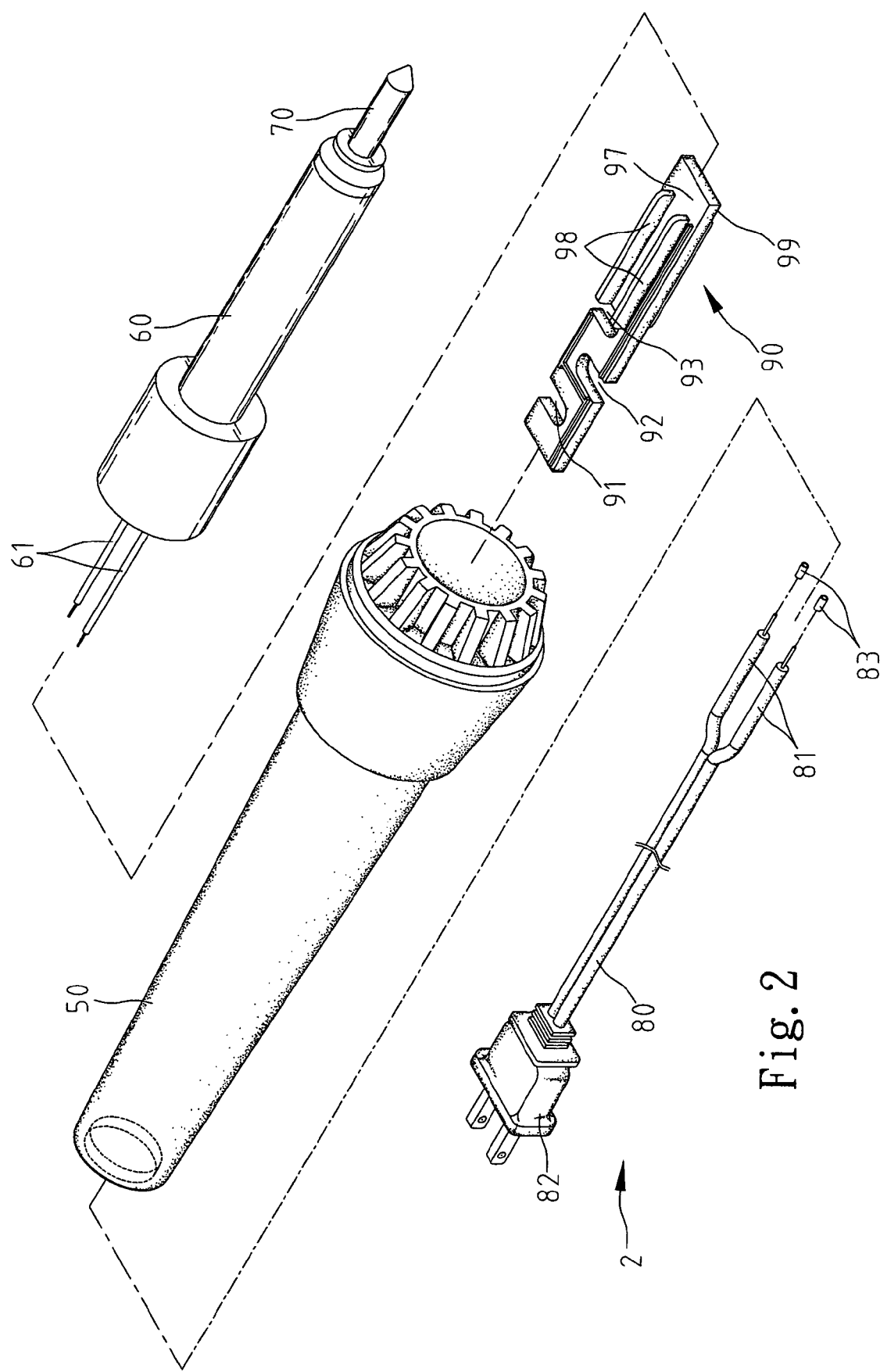
FIG. 2 is an exploded view of the soldering iron shown in FIG. 1.

Referring to FIGS. 1 and 2, a soldering iron 2 includes a handle 50, a heater 60, a soldering tip 70, a power cable 80 and a separator 90.

The handle 50 is hollow in order to receive the heater 60, a portion of the power cable 80 and the separator 90.

The heater 60 is put in the handle 50. The heater 60 includes two leads 61 extending from an end thereof.

The soldering tip 70 is attached to the heater 60.

The power cable 80 is put in the handle 50 and connected with the heater 60. The power cable 80 includes a plug 82 formed at an end and two wires 81 formed at an opposite end. The plug 82 can be plugged in a socket (not shown) so that power can be provided for the heater 60 in order to heat the soldering tip 70. The separator 90 is put in the handle 50 before the heater 60 and the power cable 80. The separator 90 is located between the heater 60 and the power cable 80. The separator 90 is a plate with a first side 97 and a second side 99. The separator 90 includes a first section and a second section. The first section defines a first aperture 91, a second aperture 92 and a third aperture 93. The second aperture 92 is located between the first aperture 91 and the third aperture 93. A pair of ridges 98 is formed on the first side 97 of the separator 90 in the second section. A pair of ridges 98 is formed on the second side 99 of the separator 90 in the second section.

Figure 3:
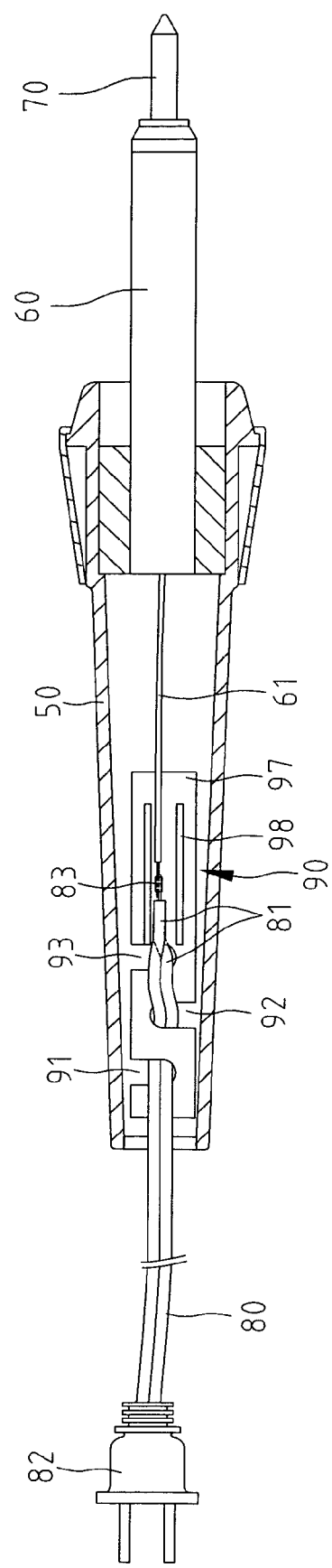
FIG. 3 is a top cross-sectional view of the soldering iron of FIG. 1.
Figure 4:
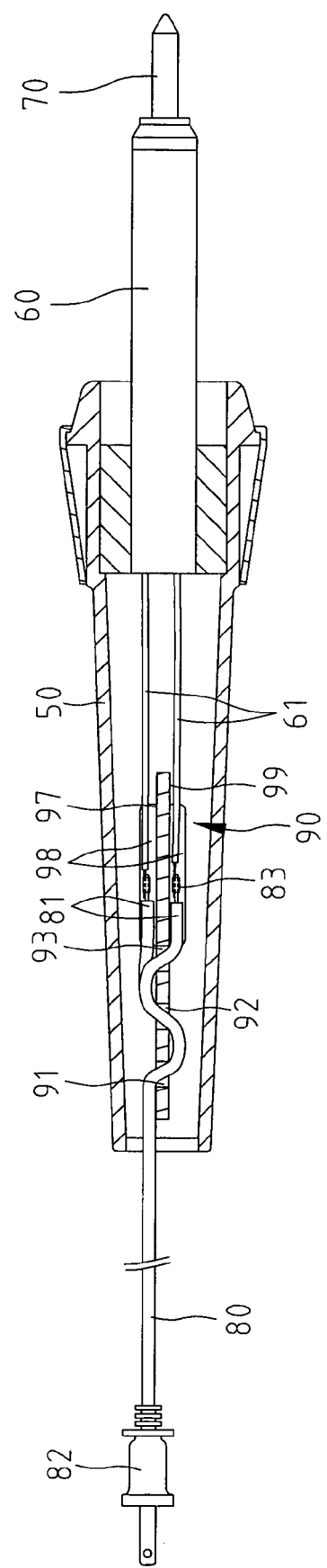
FIG. 4 is a side cross-sectional view of the soldering iron of FIG. 1.
Figure 5:
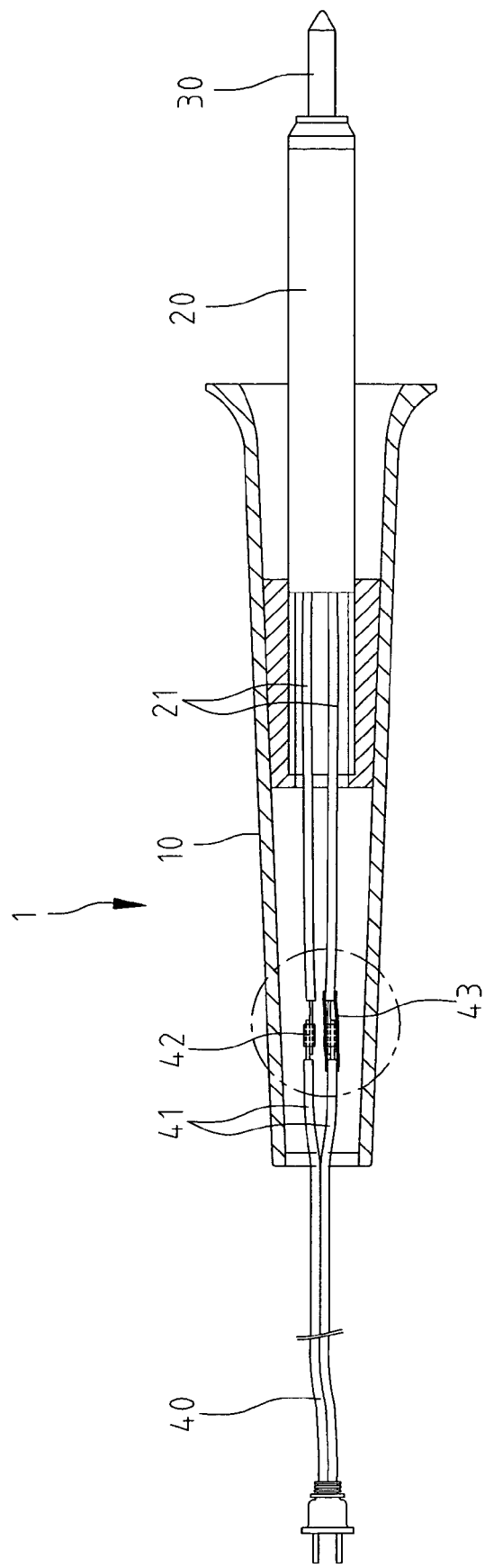
FIG. 5 is a side cross-sectional view of a conventional soldering iron.
Figure 6:
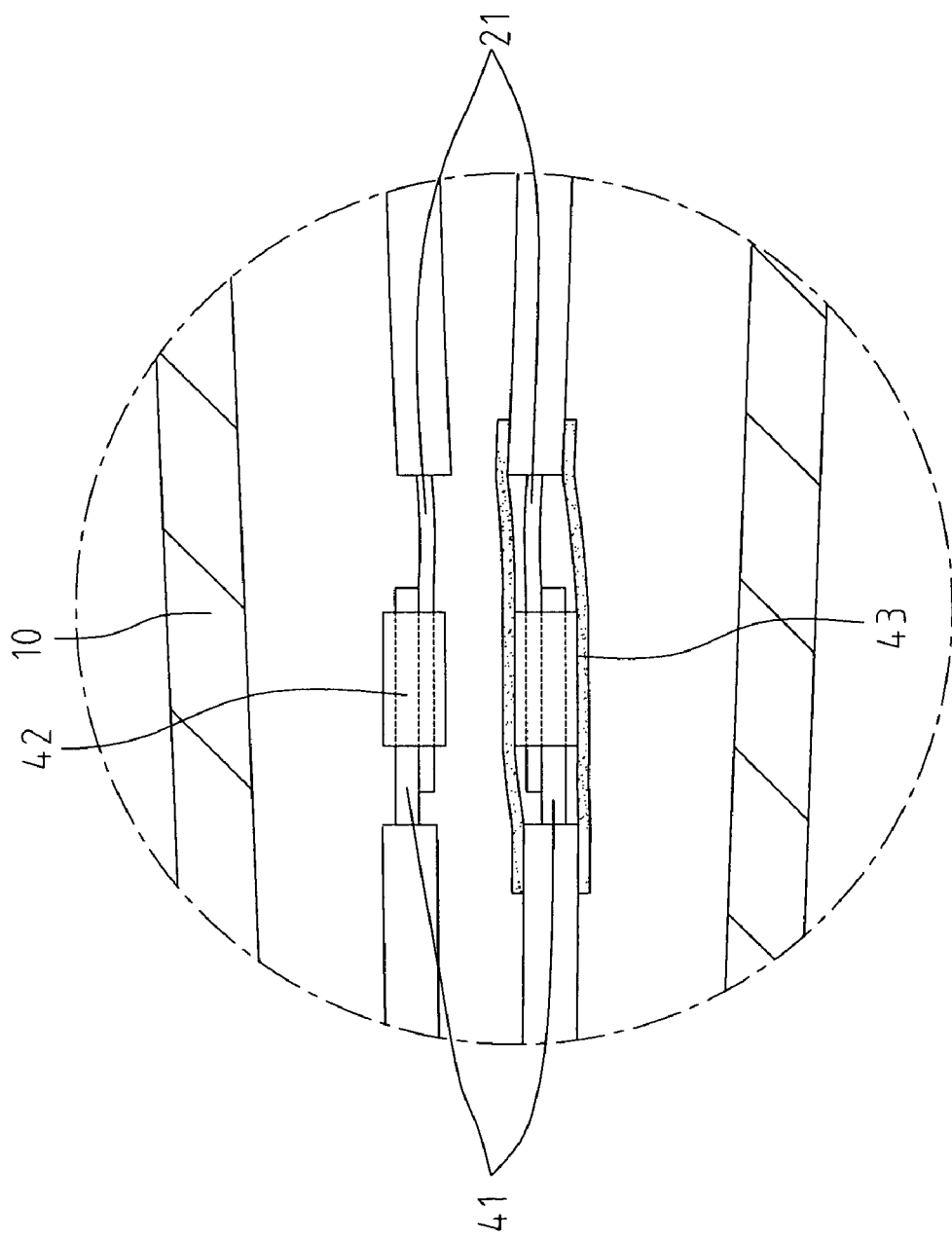
FIG. 6 is an enlarged cross-sectional partial view of the conventional soldering iron shown in FIG. 5.
Figure 7:
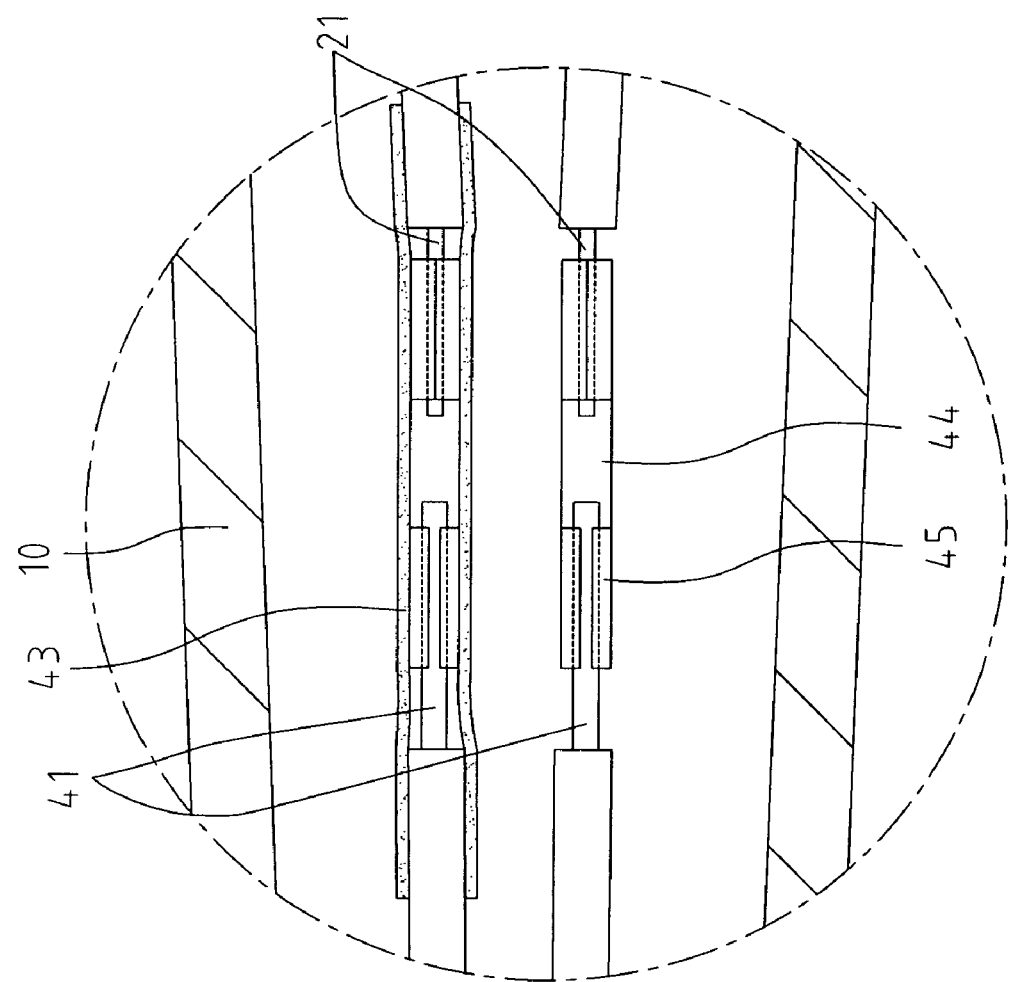
FIG. 7 is an enlarged cross-sectional partial view of another conventional soldering iron.

Referring to FIGS. 3 and 4, the power cable 80 is directed to the second side 99 from the first side 97 through the first aperture 91, and then to the first side 97 from the second side 99 through the second aperture 92. In this position, the power cable 80 diverges into two wires 81. One of the wires 81 is left on the first side 97 and connected with related one of the leads 61. The other of the wires 81 is inserted to the second side 99 from the first side 97 through the third aperture 93 and connected with the other of the leads 61. Each of the wires 81 is retained in position by related one of the pairs of ridges 98. Each wire 81 includes an exposed end not covered by a sheath. Each lead 61 includes an exposed end. The exposed end of each wire 81 is firmly connected with a related lead 61 by a ferrule 83. Alternatively, the wires 81 may be connected with the leads 61 by soldering.

The present invention has been described through detailed illustration of the preferred embodiment. Those skilled in the art can derive variation from the preferred embodiment without departing from the scope of the present invention. Therefore, the preferred embodiment shall not limit the scope of the present invention defined in the claims.

The invention claimed is:

1. A soldering iron comprising:

a handle;

a heater connected with the handle, the heater comprising two leads extending from one end thereof;

a soldering tip connected with the heater;

a power cable comprising two wires having exposed ends connected with the leads of the heater; and a separator disposed in the handle and including first and second sections longitudinally integrally formed as a single piece, wherein the separator comprises a first side and a second side, with the first section of the separator restraining longitudinal movement of the two wires relative to the separator and the second section of the separator separating the two wires from each other, wherein the first section of the separator defines an aperture extending between the first and second sides and through which the two wires extend to the first side from the second side, with another aperture extending between the first and second sides and through which one of the two wires extends to the second side from the first side while the other of the two wires remains on the first side.

2. The soldering iron according to claim 1 wherein the second section of the separator comprises two restraints each for restraining one of the leads and one of the exposed ends of the two wires.

3. The soldering iron according to claim 2 wherein each of the restraints comprises two ridges.

4. The soldering iron according to claim 1 wherein the second section of the separator comprises two restraints each for restraining one of the leads and one of the exposed ends of the two wires.

5. The soldering iron according to claim 4 wherein each of the restraints comprises two ridges.

6. The soldering iron according to claim 1 with the first and second sides being planar and flat in a spaced parallel relation.

7. The soldering iron according to claim 6 wherein the second section of the separator comprises two restraints each for restraining one of the leads and one of the exposed ends of the two wires.

8. The soldering iron according to claim 7 wherein each of the restraints comprises two ridges, with the two ridges extending from one of the first and second sides in a spaced parallel relation.

9. A soldering iron comprising:

a handle;

a heater connected with the handle, the heater comprising two leads extending from one end thereof;

a soldering tip connected with the heater;

a power cable comprising two wires connected with the leads of the heater; and a separator disposed in the handle for separating the wires from each other, wherein the separator comprises a first side and a second side, wherein the separator defines a first aperture through which the wires extend to the second side from the first side, a second aperture through which the wires extend to the first side from the second side and a third aperture through which one of the wires extends to the second side from the first side.

10. The soldering iron according to claim 9 wherein the separator comprises two restraints each for restraining one of the leads and one of the wires.

11. The soldering iron according to claim 10 wherein each of the restraints comprises two ridges.

\* \* \* \* \*